(12) United States Patent
Su et al.

(10) Patent No.: US 8,686,323 B2
(45) Date of Patent: Apr. 1, 2014

(54) FREEZABLE/MICROWAVABLE PACKAGING FILMS AND VENTING PACKAGES

(75) Inventors: Jau-Ming Su, Kent, WA (US); Paul Z. Wolak, Indianapolis, IN (US)

(73) Assignee: Pliant, LLC, Dover, DE (US)

( * ) Notice: Subject to any disclaimer, the term of this patent is extended or adjusted under 35 U.S.C. 154(b) by 36 days.

(21) Appl. No.: 12/845,902

(22) Filed: Jul. 29, 2010

(65) Prior Publication Data

US 2011/0024412 A1    Feb. 3, 2011

Related U.S. Application Data

(60) Division of application No. 11/650,903, filed on Jan. 5, 2007, now Pat. No. 7,812,293, which is a continuation-in-part of application No. 11/374,893, filed on Mar. 14, 2006, now Pat. No. 7,919,738.

(51) Int. Cl.
   *H05B 6/80*     (2006.01)

(52) U.S. Cl.
   USPC ............ 219/730; 219/728; 428/216; 428/36.6

(58) Field of Classification Search
   USPC .................. 219/730, 725, 728, 734, 759; 99/DIG. 14; 426/107, 234, 241–243; 428/34.2, 34.3, 195.1, 35.2, 35.7, 216, 428/457, 606, 343, 145.1; 156/244.1; 206/557

See application file for complete search history.

(56) References Cited

U.S. PATENT DOCUMENTS

| | | |
|---|---|---|
| 4,343,852 A | 8/1982 | Isaka et al. |
| 4,596,713 A | 6/1986 | Burdette |
| 4,705,707 A | 11/1987 | Winter |
| 4,836,438 A | 6/1989 | Rigby |
| 4,939,009 A | 7/1990 | Beavers et al. |
| 5,021,293 A | 6/1991 | Huang et al. |
| 5,030,505 A | 7/1991 | Dickinson |
| 5,045,330 A | 9/1991 | Pawlowski |

(Continued)

FOREIGN PATENT DOCUMENTS

| | | |
|---|---|---|
| CA | 1284707 | 6/1991 |
| CA | 1336158 | 7/1995 |

(Continued)

OTHER PUBLICATIONS

Website page from BirdsEye: "BirdsEye Introduces Innovative Way to Steam Vegetables Perfectly—New Product Steams Right in the Bag," http:news/steamfresh.aspx, May 18, 2006.

(Continued)

*Primary Examiner* — Quang Van
(74) *Attorney, Agent, or Firm* — Barnes & Thornburg LLP (57) ABSTRACT

Multilayer freezable/microwaveable films and packages having both low temperature resistance to withstand subzero freezer storage temperatures and high temperature resistance to withstand microwave cooking temperatures. The freezable/microwaveable films and packages include, for example, a film having at least three coextruded layers including an inner heat sealable layer, at least one core layer adjacent to the heat sealable layer, and an outer skin layer adjacent the core layer opposite the heat sealable layer. Preferably, the films and packages further include an outer protective layer laminated to the outer skin layer. The freezable/microwaveable packages can include a venting system, such as vent slits or a vent valve in the package, or vents in at least one seal of the package, to facilitate microwave heating or cooking of the package contents.

20 Claims, 5 Drawing Sheets

(56) References Cited

U.S. PATENT DOCUMENTS

| | | | |
|---|---|---|---|
| 5,298,708 A | 3/1994 | Babu et al. | |
| 5,314,749 A | 5/1994 | Shah | |
| 5,464,969 A | 11/1995 | Miller | |
| 5,849,380 A | 12/1998 | Kashiba et al. | |
| 6,006,960 A | 12/1999 | Gross | |
| 6,054,153 A * | 4/2000 | Carr et al. | 426/87 |
| 6,054,698 A | 4/2000 | Mast | |
| 6,066,375 A | 5/2000 | Shanton | |
| 6,089,419 A | 7/2000 | Gross | |
| 6,186,374 B1 | 2/2001 | Gross | |
| 6,379,497 B1 | 4/2002 | Sandstrom et al. | |
| 6,607,764 B1 * | 8/2003 | Keller | 426/107 |
| 6,660,983 B2 | 12/2003 | Monforton et al. | |
| 6,683,289 B2 | 1/2004 | Whitmore et al. | |
| 6,710,315 B2 | 3/2004 | Chisholm | |
| 6,744,028 B2 | 6/2004 | Chisholm et al. | |
| 6,815,023 B1 | 11/2004 | Tatarka et al. | |
| 6,951,999 B2 | 10/2005 | Monforton et al. | |
| 7,812,293 B2 | 10/2010 | Su et al. | |
| 2002/0068182 A1 | 6/2002 | Kelch et al. | |
| 2002/0179605 A1 * | 12/2002 | Miani et al. | 220/277 |
| 2003/0148123 A1 | 8/2003 | Musco et al. | |
| 2005/0136202 A1 | 6/2005 | Kendig et al. | |
| 2006/0020067 A1 | 1/2006 | Brant et al. | |
| 2006/0138137 A1 * | 6/2006 | Casale et al. | 220/270 |
| 2006/0257056 A1 * | 11/2006 | Miyake et al. | 383/103 |
| 2007/0048510 A1 * | 3/2007 | Loretti et al. | 428/215 |
| 2007/0215609 A1 | 9/2007 | Su et al. | |

FOREIGN PATENT DOCUMENTS

| | | |
|---|---|---|
| EP | 0214945 | 3/1987 |
| EP | 1488924 | 6/2004 |
| EP | 1488924 | 12/2004 |
| JP | 2005035567 | 2/2005 |
| JP | 2005088971 | 4/2005 |
| JP | 2006298467 | 11/2006 |
| WO | 2005084937 | 9/2005 |

OTHER PUBLICATIONS

Written Opinion of the International Searching Authority corresponding to International Application No. PCT/US2006/49209, mailed Feb. 20, 2008, seven pages.

International Search Report corresponding to International Application No. PCT/US2006/49209, mailed Feb. 20, 2008, four pages.

Written Opinion of the International Search Authority corresponding to International Application No. PCT/US2008/050416, mailed Jan. 8, 2008, eight pages.

International Search Report corresponding to International Application No. PCT/US2008/050416, mailed Jan. 8, 2008, six pages.

International Preliminary Report on Patentability corresponding to International Application Serial No. PCT/US2006/049209, mailed Sep. 25, 2008, seven pages.

European Search Report corresponding to European Patent Application Serial No. 06848120.9-1217, dated Mar. 9, 2009.

Office Action mailed May 20, 2010, for Canadian Patent Application Serial No. 2642278.

International Preliminary Report on Patentability corresponding to International Application No. PCT/US08/050416, mailed Jul. 16, 2009.

* cited by examiner

FREEZABLE/MICROWAVABLE PACKAGING FILMS AND VENTING PACKAGES

RELATED APPLICATIONS

This application is a divisional of U.S. application Ser. No. 11/650,903, filed on Jan. 5, 2007, which is a continuation-in-part of U.S. application Ser. No. 11/374,893, filed on Mar. 14, 2006, currently pending. The disclosure of U.S. application Ser. Nos. 11/374,893 and 11/650,903 are hereby incorporated by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present technology generally relates to multilayer films and packages made from multilayer films that are suitable for use as frozen food packaging, and that can also be directly microwaved for heating or cooking of contents contained therein. Freezable/microwaveable packages of the present technology can include a venting system such as, for example, a vent or vent holes, to facilitate microwave heating or cooking of the package contents.

BACKGROUND OF THE INVENTION

In recent years, there has been an increase in the number of food products that are designed or intended to go directly from the freezer to the microwave for heating or cooking. Such food products often require packaging that also can go directly from freezer storage temperatures, typically temperatures ranging from about −20° C. to about 0° C., to microwave cooking temperatures ranging from about 71° C. or greater. Additionally, it is desirable that such packaging perform without fracturing in the freezer, and without melting or bursting in the microwave. With respect to foods such as vegetables, the temperatures reached during microwave cooking typically range from about 71° C. to about 105° C. However, when the packaged food items include meats, fish, grease, and/or oils, for example, the temperature of the items can reach up to about 150° C. when heated during microwave preparation.

One type of container typically used for packaging frozen microwaveable foods is a rigid container, such as a paperboard carton or container structure, coupled with a lid. Such rigid microwaveable containers are disclosed, for example, in U.S. Pat. No. 6,066,375, to Shanton; U.S. Pat. No. 6,379,497, to Sandstrom, et al.; and U.S. Pat. No. 4,836,438, to Rigley. The material and structure of such containers are not suitable for use on automatic vertical-form-fill-seal machines to package frozen foods, and tends to result in increased production costs.

Additionally, there are a variety of multilayer films in the art that can be used as packaging for frozen food products. Such multilayer films are primarily made from polyethylene resins which allegedly exhibit cold-temperature resistance, i.e., being able to withstand temperatures ranging from about −20° C. to about 0° C. without shattering or fracturing. Polyethylene films, however, soften at microwave temperatures, typically temperatures ranging from about 160° F. to about 220° F. (about 71° C. to about 105° C.) or greater, which causes weakening of the bonding strength of the polyethylene seal layer and/or between the other polyethylene film layers and adjacent layers, leading to seal failure and/or layer delamination and leakage of the package contents during microwaving. Thus, frozen food products must be removed from such food packaging materials and then placed on a microwaveable dish or container before the products can be heated or cooked in a microwave. This conventional microwave cooking method tends to result in large temperature variation in the foods and can cause the formation of cold, hot and/or dried spots in the foods due to excessive moisture loss in certain areas of the food. Such additional food preparation steps also require additional time, and tend to be messy.

There are also microwaveable film packaging materials known in the art. One such packaging material is a three-layer laminated film structure containing polypropylene homopolymer, adhesive, and polyethylene terephthalate (PET). However, this particular film packaging material in the art becomes brittle when subjected to freezer temperatures and breaks apart or shatters. Thus, although the packaging material may be microwaveable, it is not suitable for frozen food applications.

To meet the requirements for freezable/microwaveable food packaging, the packaging materials must have two essential properties: (1) they must have good low temperature (subzero) resistance so that the packaging can withstand subzero freezer storage temperatures without fracturing or shattering; and (2) they must have good high-temperature resistance to prevent the package from melting or bursting in the microwave. Currently available film packaging materials can only handle one end of the temperature spectrum or the other, not both, and therefore are unsuitable for the storage of food products in the freezer which will subsequently be subjected to heating or cooking in the microwave to prepare the food products contained therein for consumption.

Thus, there is a need in the art for films and packaging materials that are designed to package frozen foods for subsequent microwave heating or cooking without requiring removal from the packaging. There is also a need for freezable, microwavable films and packaging materials that reduce the amount of moisture loss by foods during microwave cooking. There is a further need for freezable, microwavable films and packaging that reduce the temperature variation that results during microwaving of foods.

BRIEF SUMMARY OF THE INVENTION

The present technology generally relates to multilayer freezable, microwaveable films and packages that have improved resistance to fracturing at low temperatures, such as freezer storage temperatures, and improved resistance to melting or bursting at high temperatures, such as the temperatures generated during the microwave cooking of foods. Preferably, the present technology also reduces and/or improves the distribution of the amount of moisture loss food experiences during microwave cooking.

In one or more preferred embodiments, freezable, microwaveable films and packages of the present technology comprise a multilayer coextruded film having an inner, heat sealable layer, at least one adjacent core layer, and an outer skin layer adjacent to the at least one core layer, opposite the heat sealable layer. Films and packages of the present technology preferably also include at least one outer protective layer bonded to the outer skin layer. Particularly preferred embodiments of freezable, microwaveable packages of the present technology can include a venting system, such as vent slits or a vent valve in the package, or vents in at least one seal of the package, to facilitate improved microwave heating or cooking of the package contents while maintaining food moistness.

One aspect of the present technology is directed to multilayer films having improved resistance to fracturing at temperatures of about 0° C. or below, making the films suitable for use as a packaging material for frozen food products, as well as improved resistance to melting or bursting at high temperatures, such as temperatures of about 71° C. or greater, making the films suitable for use in the microwave.

In at least one film embodiment, the present technology provides a multilayer film comprising a multilayer coextruded polyolefin film comprising a heat-sealable, inner skin layer formed from at least one polypropylene/alpha-olefin copolymer; at least one core layer adjacent to the heat sealable inner layer, wherein the core layer is formed from a material having a melting point of greater than about 71° C., and an outer skin layer adjacent to the at least one core layer, opposite the heat sealable inner layer, wherein the outer skin layer is formed from at least one polyethylene resin; and at least one outer protective layer bonded to the outer skin layer of the polyolefin film.

In at least another film embodiment, the present technology provides multilayer freezable, microwaveable film comprising: (a) a polyolefin film comprising an inner heat sealable layer, at least one core layer adjacent to the heat sealable layer, and an outer skin layer adjacent to the at least one core layer opposite the heat sealable layer; wherein the inner heat sealable layer comprises at least one polypropylene/alpha-olefin copolymer having a melting point of at least about 105° C. and a melt flow rate of about 0.5 g/10 min. to about 45 g/10 min. at about 230° C.; wherein the at least one core layer comprises a polymeric material having a melting point of at least 105° C.; and wherein the outer skin layer comprises at least one polypropylene/alpha-olefin copolymer having a melting point of at least about 120° C.; and (b) at least one outer protective layer bonded to the outer skin layer. In at least one preferred embodiment of this aspect of the present technology, the freezable, microwaveable film can be exposed to a temperature of from about 0° C. to about −20° C. without fracturing, and can also be exposed to a temperature of about 105° C. or greater without melting or bursting.

Another aspect of the present technology is directed to freezable, microwaveable packaging made from films of the present technology, that can be utilized for freezing and storing food products and can be subsequently microwaved within the packaging in order to heat and/or cook the food products.

A further aspect of the present technology is directed to freezable, microwaveable packages that incorporate one or more venting devices or systems. Such venting systems provide an outlet for heat and steam to facilitate microwave heating or cooking of the package contents. Examples of venting devices or systems include, for example, vent slits or a vent valve in a freezable, microwavable package, such as, for example, packages of the present technology. Another example of a venting device or system is the utilization of at least one vent in at least one seal of such packaging. In at least some preferred embodiments of packages containing a venting system of the present technology, the package reaches a peak internal pressure of at least about 0.3 psi during microwave cooking when the internal temperature of the package is at least about 71° C.

In at least some embodiments, the present technology provides a multilayer freezable, microwaveable package comprising a polyolefin film comprising a heat sealable layer, and an outer protective layer bonded to the polyolefin film; wherein the heat sealable layer of the polyolefin film is sealed to itself to form the package; and wherein the package further comprises at least one vent slit through the package. In preferred embodiments of such packages, the package has at least one back seal along the back of the package, at least one first end seal at a first end of the package, and at least one second end seal at a second end of the package, and the at least one vent slit is a distance of at least about 1 centimeter from at least one of the seals.

In other package embodiments, the present technology provides a multilayer freezable, microwaveable package having at least one vent formed by at least one opening in the at least one seal of the package. Such packages comprise a polyolefin film comprising a heat sealable layer, and an outer protective layer bonded to the polyolefin film, and the heat sealable layer of the polyolefin film is sealed to itself to form at least one seal. The at least one seal of the package comprises at least one vent formed by at least one opening in the at least one seal. In preferred embodiments of such packages, the package has at least one back seal, at least one first end seal, and at least one second end seal, and the at least one vent is formed by at least one opening in the at least one first end seal or the at least one second end seal.

In still other package embodiments, the present technology provides a multilayer freezable, microwaveable package that has a vent valve comprising a vent hole, a nonwoven patch, and a plastic patch. In a preferred embodiment, the package comprises a polyolefin film comprising a heat sealable layer, and an outer protective layer bonded to the polyolefin film, and the heat sealable layer of the polyolefin film is heat sealed to itself to form at least one seal.

BRIEF DESCRIPTION OF SEVERAL VIEWS OF THE DRAWINGS

While the specification concludes with claims particularly pointing out and distinctly claiming the subject matter regarded as the present invention, it is believed that the presently described technology will be more fully understood from the following description of various embodiments taken in conjunction with the accompanying figures, in which:

DETAILED DESCRIPTION OF THE INVENTION

The present technology generally relates to multilayer films and packages that do not fracture at low temperatures, such as freezer storage temperatures for food products, and also do not melt or burst at high temperatures, such as temperatures generated during the microwave cooking of foods. Such freezable, microwavable films and packages of the present technology preferably comprise a coextruded multilayer film, and an outer protective layer bonded to the multilayer film. Freezable, microwaveable packages of the present technology preferably include a venting system, such as vent slits or a vent valve in the package, or vents in at least one seal of the package, to facilitate venting of steam and/or heat during microwave heating or cooking of the package contents.

Freezable, Microwavable Films

Films of the present technology generally comprise a polyolefin film and an outer protective layer. Polyolefin films of the present technology preferable comprise at least three layers, such as an inner heat sealable layer, at least one core layer adjacent to the inner heat sealable layer, and an outer skin layer adjacent to the at least one core layer, and opposite of the inner heat sealable layer. The protective outer layer is preferably bonded to the outer skin layer of the polyolefin film.

Figure 1:
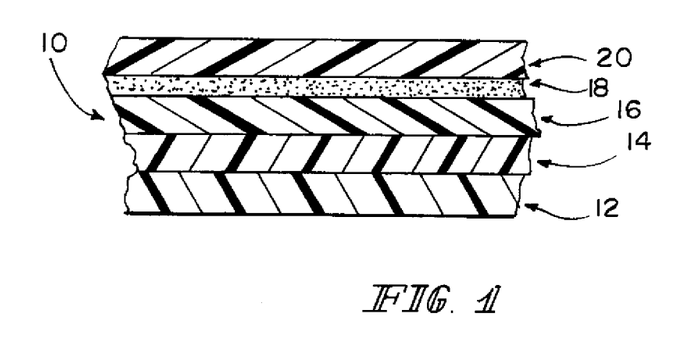
FIG. 1 is a cross-sectional view of a multilayer film of at least one embodiment of the present technology.

FIG. 1 illustrates at least one embodiment of a film of the present technology. As illustrated in FIG. 1, a multilayer film 10 of the present technology comprises a polyolefin film having at least three layers: (a) an inner heat sealable layer 12; (b) a core layer 14 adjacent to the inner heat sealable layer 12; and (c) an outer skin layer 16 adjacent to the core layer 14 opposite the inner heat sealable layer 12, such that the core layer 14 is sandwiched between the inner heat sealable layer 12 and the outer skin layer 16. The film illustrated in FIG. 1 further shows an adhesive 18 that bonds the outer skin layer 16 of the polyolefin film to an outer protective layer 20 to form the multilayer freezable and microwaveable film 10.

The inner heat sealable layer 12 of the polyolefin film is formed from at least one thermoplastic polymer that can be heat sealed to itself or to another film or film layer. In order to make a film suitable for use as packaging for both freezer storage and microwave heating, the inner heat sealable layer of the multilayer film preferably has the following properties: (1) a heat seal initiation temperature from about 105° C. to about 150° C. in order to be able to form adequate heat seals on standard packaging machines or form-fill-seal machines (either vertical or horizontal); (2) the ability to maintain its strength and have good ductility in subzero freezer temperatures, such as temperatures from about −20° C. to about 0° C.; and (3) the ability to maintain a heat seal at microwave temperatures, such as temperatures from about 71° C. to about 150° C. without melting or bursting, and to prevent leakage of the package contents.

Commonly used resin materials for forming heat sealable layers of frozen food packages include, for example, polyethylene (LDPE or LLDPE) or derivatives thereof, such as ethylene vinyl acetate (EVA), or blends thereof. Unfortunately, such commonly used resin materials do not possess all of the properties needed for a heat sealable layer suitable for a microwaveable freezer packaging material. Polyethylene materials have a melting temperature from about 70° C. to about 110° C., and heat seal initiating temperatures from about 70° C. to about 110° C. Such commonly used resin materials therefore cannot resist or withstand high temperature cooking in a microwave, such as temperatures from about 71° C. to about 150° C., because exposure to such temperatures tends to result in softening and weakening of the polyethylene seal layer, resulting in heat seal or package failure.

Suitable materials for forming heat sealable layers of the freezable, microwaveable films and packages of the present technology are those which have a seal initiation temperature within the range of from about 105° C. to about 150° C., and more preferably from about 105° C. to about 135° C. Further, suitable materials for forming heat sealable layers of the present technology are those which have a melting point of at least about 105° C. Preferably, materials used in heat sealable layers of the present technology have a melting point between about 105° C. and about 150° C., such as, for example, about 110° C., about 115° C., about 120° C., about 125° C., about 130° C., about 135° C., about 140° C., or about 145° C.

In preferred embodiments, heat sealable layers of the present technology are formed from at least one copolymer of propylene and alpha-olefin, which are referred to herein as being propylene/alpha-olefin copolymers. Suitable propylene/alpha-olefin copolymers for use with the present technology include, for example, copolymers having a melt flow rate from about 0.5 g/10 min. to about 45 g/10 min., when measured at 230° C. in accordance with ASTM D1238-04. More preferably, propylene/alpha-olefin copolymers for use with the present technology include, copolymers having a melt flow rate from about 0.5 g/10 min. to about 20 g/10 min., when measured at 230° C. in accordance with ASTM D1238-04.

Suitable propylene/alpha-olefin copolymers for use with the present technology include, but are not limited to, propylene/ethylene copolymers, propylene/butene copolymers, propylene/hexene copolymers, propylene/octene copolymers, mixtures thereof, and blends thereof. Preferably, heat sealable layers of the present technology can be formed from at least one propylene/ethylene copolymer, and more preferably, a blend of at least two propylene/ethylene copolymers. Particularly preferred propylene/ethylene copolymers for use with the present technology include, for example, polypropylene copolymers comprising an ethylene comonomer in an amount of about 1% to about 8% by weight of the copolymer. Without wishing to be bound by any particular theory, it is believed that the incorporation of ethylene comonomer in the propylene/ethylene copolymer increases irregularity of the polymer chains which reduces the crystallinity of the polymer. This results in a lower seal initiation temperature and improved ductility at subzero temperatures than if homopolymer polypropylene were used as the heat sealable material.

The desired thickness of the heat sealable layer depends, in part, upon the size of the package to be made from the freezable, microwaveable packaging film of the present technology. The heat sealable layer is preferably thick enough to form seal that has a seal strength of at least about 1,000 g/in and will not fail when exposed to temperatures from about 71° C. to about 150° C., yet not so thick that it negatively affects the manufacture of the film. In general, the thickness of the heat sealable layer can range from about 0.1 mil to about 3 mils. The thickness of heat sealable layers of the present technology can be, for example, about 0.2 mil, about 0.25 about 0.4 mil, about 0.5 mil, about 0.6 mil, about 0.75, about 1 mil, about 1.25 mils, about 1.5 mils, about 1.75 mils, about 2.0 mils, about 2.25 mils, about 2.5 mils, about 2.75 mils, or about 2.8 mils. As another example, in one exemplary end use application, heat seal layers used in films for 12 ounce packages of frozen vegetables preferably have a thickness from about 0.5 mil to about 1.25 mils.

As illustrated in FIG. 1, the at least one core layer 14 is adjacent to the inner heat sealable layer 12. Core layers suitable for use with the present technology are formed from thermoplastic materials that are compatible with the materials selected for the heat sealable layer, and that can form a strong adhesive bond with the heat sealable layer in order to prevent delamination of the layers from occurring during freezer storage, at temperatures from about −20° C. to about 0° C., and microwave cooking, at temperatures from about 71° C. to about 150° C. The core layer material should also have a melting point of at least about 71° C., more preferably at least about 100° C., or alternatively at least about 105° C., in order to maintain its solid state and strength if the heat sealable layer softens in the microwave. Most preferably, the core layer material has a melting point of at least about 150° C. In some embodiments, the at least one core layer has a melting point of from about 105° C. to about 165° C., such as, for example, about 110° C., about 115° C., about 120° C., about 125° C., about 130° C., about 135° C., about 140° C., about 145° C., about 150° C., about 155° C., or about 160° C.

Examples of suitable materials for use in forming core layers of the present technology include, but are not limited to, homopolymer polypropylenes, high density polyethylenes (HDPE), blends thereof, or mixtures thereof. For example, one preferred material for the core layer is a homopolymer polypropylene having a melt flow rate of from about 0.5 g/10 min. to about 25 g/10 min. when measured at 230° C. in accordance with ASTM D1238-04, and a melting point of from about 158° C. to about 165° C. As another example, high density polyethylene utilized for the core material preferably can exhibit a melt flow rate of from about 0.1 g/10 min to about 12 g/10 min. when measured at 230° C. in accordance with ASTM D1238-04.

The thickness of core layers for use with the present technology can vary depending upon the number of core layers and the size of the package to be made from the freezable, microwaveable packaging film of the present technology. In at least some embodiments, the thickness of a core layer can be from about 0.1 mil to about 4 mils. The thickness of a core layer of the present technology can be, for example, about 0.2 mil, about 0.25 about 0.4 mil, about 0.5 mil, about 0.6 mil, about 0.75, about 1 mil, about 1.25 mils, about 1.5 mils, about 1.75 mils, about 2.0 mils, about 2.25 mils, about 2.5 mils, about 2.75 mils, about 2.8 mils, about 3 mils, about 3.25 mils, about 3.4 mils, about 3.5 mils, about 3.75 mils, or about 3.8 mils. As another example, in one exemplary end use application, core layers used in films for 12 ounce packages of frozen vegetables preferably have a thickness from about 0.75 mil to about 2.5 mils.

As illustrated in FIG. 1, the outer skin layer 16 is adjacent to the at least one core layer 14. The outer skin layer can be formed from at least one thermoplastic material, and is preferably formed from a blend of thermoplastic materials.

In some embodiments, the outer skin layer can be formed from blends of polyethylene resins, or derivatives of polyethylene resins, that have a melt flow index from about 0.50 g/10 min. to about 20 g/10 min. when measured at 190° C. in accordance with ASTM D1238-04. Examples of polytheylene resins and derivatives thereof include, but are not limited to low density polyethylene (LDPE), linear low density polyethylene (LLDPE), high density polyethylene (HDPE) and ethylene vinyl acetate (EVA). One preferred blend of resins comprises a low density polyethylene polymer (LDPE) having a melt flow index of about 0.5 g/10 min. to about 4.5 g/10 min. (measured at 190° C. in accordance with ASTM D1238-04) and a density of about 0.910 g/cc to about 0.928 g/cc, and linear low density polyethylene (LLDPE) having a melt flow index of about 0.5 g/10 min. to about 4.5 g/10 min. (measured at 190° C. in accordance with ASTM D1238-04) and a density of about 0.910 g/cc. to about 0.928 g/cc.

It should be appreciated that some blends of polyethylene resins have a melting temperature below about 120° C. Such blends are suitable for some embodiments of the present technology, such as embodiments used in packages for frozen vegetables, and other applications where the microwave cooking temperature does not generally exceed about 105° C.

In some embodiments of the present technology, however, it is desirable that the outer skin layer of the polyolefin film have a melting temperature of at least 120° C., and preferably greater than about 120° C. In such embodiments, the outer skin layer preferably comprises a propylene/ethylene copolymer, a propylene/butene copolymer, a propylene/hexene copolymer, a propylene/octene copolymer, a mixture thereof, or a blend thereof. In some particularly preferred embodiments, the outer skin layer comprises a propylene/ethylene copolymer or a blend of at least two propylene/ethylene copolymers. In some embodiments, the outer skin layer comprises at least one propylene/ethylene copolymer comprising from about 1% to about 8% by weight of an ethylene comonomer. Preferred, propylene/ethylene copolymers have a melt flow rate of from about 0.5 g/10 min. to about 45 g/10 min. at about 230° C., as measured in accordance with ASTM D1238-04.

The thickness of outer skin layers for use with the present technology can vary depending upon the size of the package to be made from the freezable, microwaveable packaging film of the present technology. In at least some embodiments, the outer skin layer can have a thickness of from about 0.1 to about 4 mils. The thickness of an outer skin layer of the present technology can be, for example, about 0.2 mil, about 0.25 about 0.4 mil, about 0.5 mil, about 0.6 mil, about 0.75, about 1 mil, about 1.25 mils, about 1.5 mils, about 1.75 mils, about 2.0 mils, about 2.25 mils, about 2.5 mils, about 2.75 mils, about 2.8 mils, about 3 mils, about 3.25 mils, about 3.4 mils, about 3.5 mils, about 3.75 mils, or about 3.8 mils. As another example, in one exemplary end use application, outer skin layers used in films for 12 ounce packages of frozen vegetables preferably have a thickness from about 0.5 mil to about 1.25 mils.

Polyolefin films of the present technology may be manufactured using a variety of known film processing techniques (e.g., coextrusion, lamination, and the like). For example, a polyolefin film of the present technology can be made via a blown film coextrusion process. In such an embodiment, the multilayer film is formed using a blown film apparatus composed of a multi-manifold circular die head having concentric circular orifices. The multilayer film is formed by coextruding a molten layer through a circular die, and a molten layer on the other or each opposite side of the first layer through additional circular dies concentric with the first circular die. Next, a gas, typically air, is blown through a jet that is concentric with the circular dies, thereby forming a bubble that expands the individual layers. The bubble is collapsed onto itself to form a pair of multilayer films attached at two opposite edges. Usually, the pair of attached multilayer films are then cut apart at one or more edges and separated into a pair of multilayer films that can be rolled up.

Alternatively, polyolefin films of the present technology can be manufactured using other extrusion processes known in the art, such as a cast film process, wherein melted and plasticized streams of individual layer materials are fed into a coextrusion die, such as a multi-manifold die. Upon emersion from the die, the layers are quenched to form a single multilayer film of polymeric material.

Polyolefin films of the present technology can also be manufactured by a lamination process, in which each layer of the film is formed separately, and the layers are then laminated together to arrive at the polyolefin film.

The layer sequence in polyolefin films of the present technology, in particular the selection of materials for the layers and the arrangement of the particular layers in the polyolefin film, is important for obtaining a packaging film that does not fracture or crack when exposed to subzero temperatures and that does not melt or burst when exposed to microwave temperatures. For example, if polyethylene, a typical material used for frozen food packaging, is used for the core layer, rather than for the outer skin layer as described herein, the adhesion strength between such a polyethylene core and the copolymer polypropylene heat sealable layer is not sufficient. This tends to result in delamination between the polyethylene core layer and the heat sealable layer, and seal failure when the film is exposed to microwave temperatures. However, it has been surprisingly found that if a homopolymer polypropylene material is used for the core layer as described herein, the strength of the multilayer film and the integrity of the heat seal can be maintained during exposure of the film to microwave temperatures. Again, not wanting to be bound by any particular theory, it is believed that the polypropylene material forms a strong adhesive bond with the copolymer polypropylene heat sealable layer and, due to its high melting point, can maintain its solid state and strength at microwave temperatures, thereby providing support to the heat sealable layer.

In the past, homopolymer polypropylene materials (such as those described herein for use with the present technology) have not generally been used for frozen food packaging materials because such materials tend to have poor heat seal strength, as well as poor low temperature resistance, causing the packaging materials to fracture or shatter when exposed to freezer temperatures. It has been surprisingly discovered, however, that homopolymer polypropylene materials can be used successfully in core layers of the freezable/microwaveable films of the present technology by coextruding the inner heat sealable layer comprising polypropylene copolymers on one side of a polypropylene core layer, and the outer skin layer comprising polyethylene on the other side of the core layer. It is believed that the inner and outer layers act to insulate the polypropylene core, thereby minimizing the tendency for embrittlement of the polypropylene layer to occur at subzero temperatures.

Returning to FIG. 1, in at least some embodiments, freezable, microwaveable films of the present technology can include an adhesive layer 18 which bonds the outer protective layer 20 to the outer skin layer 16. Suitable adhesives for use herein are those that can maintain their adhesive strength at temperatures above about 100° C. and that are used to bond dissimilar materials together. Examples of suitable adhesive materials for use herein include, but are not limited to, polyurethanes, epoxides, hot-melts of ethylene vinyl acetate, hot melts of polyamide, and hot-melts of polyester. Suitable polyurethane adhesive are available, for example, from Rohm and Hass Company, in Elgin, Ill., under trade name MOR-FREE™, from Liofol Company, in Cary, N.C., under trade name Tycel®, and from Sovereign Specialty Chemicals, in Buffalo, N.Y., under the trade name Primabond®. One suitable epoxide adhesive, for example, is a cycloaliphatic epoxide available from Dow Chemical, Houston, Tex. under the trade name Cyracure®.

The adhesive may be applied to the outer skin layer 16, the outer protective layer 20, or both, utilizing any acceptable technique known in the art. For example, a lamination coater may be used to apply the adhesive. Alternatively, solvent based, solventless, or water-based adhesive lamination equipment may be used for laminating the outer protective layer 20 to the outer skin layer 16. The adhesive is applied in an amount sufficient to bond the outer protective layer to the outer skin layer of the coextruded film. In general, the thickness of the adhesive layer will typically be in the range of about 0.01 mil to about 0.5 mils, or more preferably from about 0.02 mil to about 0.1 mil.

In some alternative embodiments, films of the present technology do not have an adhesive layer 18. In such embodiments, non-adhesive bonding techniques known in the art may be utilized to bond the outer protective layer to the outer skin layer. For example, ultrasonic welding or heat bonding may be used to bond the outer protective layer to the outer skin layer.

The outer protective layer bonded to the polyolefin film provides strength, stiffness and a glossy surface to the multilayer film. If a printed image is applied to the outer skin layer of the polyolefin film, the outer protective layer also protects the printed image from heat distortion and degradation. Suitable materials for forming the outer protective layer are those materials that have a high temperature resistance, such as, for example, polyethylene terephthalate (PET) and polyamides, including polyamide 6 and polyamide 6.6 (nylon). Also, oriented films, such as a biaxially oriented polypropylene films, or a biaxially oriented propylene/ethylene copolymer films can be used for forming the outer protective layer. The outer protective layer can have a thickness ranging from about 0.1 to about 3 mils.

Figure 2:
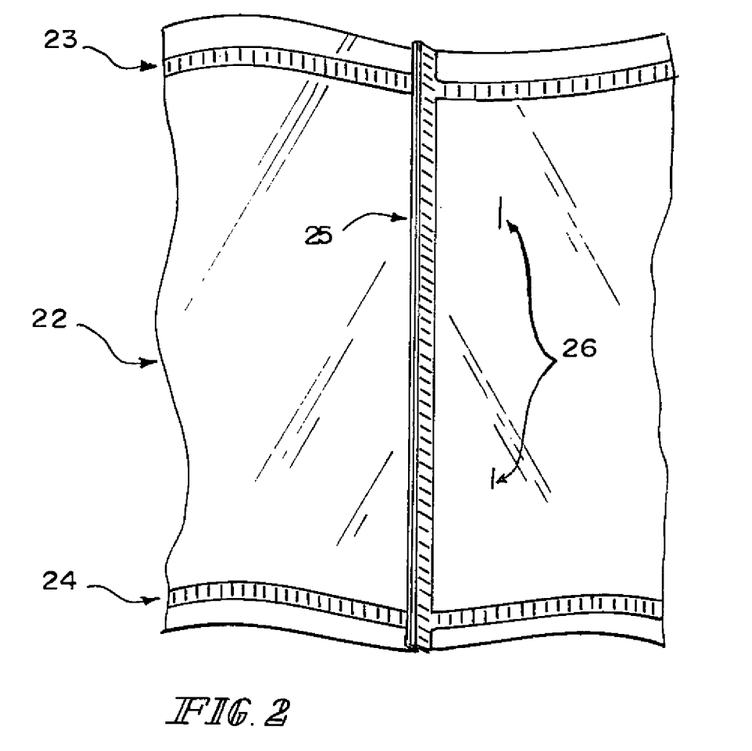
FIG. 2 illustrates one embodiment of a microwaveable pouch formed from a multilayer film of the present technology having two vent slits in the pouch.

The multilayer freezable, microwaveable films described herein may be formed into packaging, such as, for example, pouch-shaped package 22 illustrated in FIG. 2, for fresh or frozen microwaveable food products. Although the package embodiment of FIG. 2 includes vent slits 26, it should be understood that packages made from freezable, microwaveable films of the present technology are not required to include a venting system. Conventional packaging equipment, such as vertical form fill and seal equipment or horizontal form fill and seal equipment can be used to form the package. Typically, in the operation of such equipment, the film to be formed into the package is fed from a roll to the equipment where it is wrapped about a forming tube and a longitudinal heat seal is made to form the film into a tube. The longitudinal seal is often referred to as being the vertical seal or the back seal of the package. Thereafter, one end of the tube is closed and the inner heat sealable layers are heat sealed together to form a pouch having a first end seal, which is then filled with a predetermined quantity of product. The open end of the filled pouch is then closed and the inner heat sealable layers are heat sealed together to form a second end seal, resulting in a product packaged in a sealed pouch. Such pouches are sometimes referred to as being pillow-shaped.

Venting Systems

When packages of the present technology are going to be microwaved, it can be desirable to pierce the package to form slits. The purpose of such slits is to vent heat and steam which may build up during microwave cooking as the temperature inside the package reaches at least about 71° C. or greater, thereby preventing the package from bursting due to the high pressure building up during microwaving. In preferred embodiments of the present technology, however, freezable, microwaveable packages comprise a venting system, and therefore do not need to be pierced by a consumer or end user prior to microwaving the package and its contents.

Venting systems of the present technology include, for example, vent slits in the package, a vent valve in the package, and vents formed by an opening in at least one seal of the package. Such venting systems preferably allow the pressure inside the package, referred to herein as the internal pressure of the package, to initially increase during microwave cooking as the internal temperature of the package and any contents of the package increases to a desired temperature. Venting systems of the present technology then function to control the internal pressure of the package by venting heat and steam as the internal temperature of the package and any food within the package reaches temperatures from about 71° C. to about 150° C. The peak internal pressure of packages having venting systems of the present technology preferably reaches at least about 0.3 psi during microwave cooking when the internal temperature of the package is at least about 71° C. More preferably, the peak internal pressure of a package having a venting system of the present technology preferably is from about 0.5 psi to about 1.0 psi.

In at least one embodiment of a venting system of the present technology, a multilayer freezable, microwaveable package is provided comprising at least one vent slit through the package. Preferably, the package also comprises a polyolefin film comprising a heat sealable layer, and an outer protective layer bonded to the polyolefin film, and the heat sealable layer of the polyolefin film is sealed to itself to form the package. The at least one vent slit can be any length from about 2 millimeters to about 12 millimeters in length, and is more preferably from about 5 millimeters to about 10 millimeters in length. Vent slits of the present technology can be, for example, about 3 millimeters, about 4 millimeters, about 5 millimeters, about 6 millimeters, about 7 millimeters, about 8 millimeters, about 9 millimeters, about 10 millimeters, or about millimeters. It has been found, for example, that the most preferred length for a 12 ounce package of frozen mixed vegetables is from about 4 millimeters to about 9 millimeters.

Particularly preferred embodiments of such vent systems comprise at least two vent slits. An example of such an embodiment is illustrated in FIG. 2. As shown in FIG. 2, this embodiment of a food package 22 is a pouch, or pillow-shaped package having a first end seal 23, a second end seal 24, and a back seal 25. Package 22 also has two vent slits 26. In embodiments of the present technology having at least two vent slits, each vent slit is preferably from about 2 millimeters to about 12 millimeters in length, and is more preferably from about 5 millimeters to about 10 millimeters in length. In some embodiments, packages of the present technology have 2, 3, 4, 5, or greater than 5 vent slits in the package.

As illustrated, vent slits 26 are oriented parallel to the back seal of the package. In alternative embodiments, the vent slit or vent slits can be in any orientation and at any location on the package, although vent slits are preferably on the back of the package and are at least about 1 centimeter from any of the seals of the package. Accordingly, in at least one embodiment of the present technology, a package is provided that has at least one back seal, at least one first end seal, and at least one second end seal, and the at least one vent slit is a distance of at least about 1 centimeters from at least one of the seals of the package. Alternatively, the at least one vent slit can be a distance of at least about 1.5 centimeters, about 2 centimeters, about 2.5 centimeters, about 3 centimeters, about 4 centimeters, about 5 centimeters, or greater that about 5 centimeters from at least one of the seals. While not being bound by any particular theory, it is believed that placing at least one vent slit of the present technology at least about 1 centimeter from the seals of the package prevents a build-up of heat and/or steam near the package seals during the microwaving process, and therefore assists in maintaining the structural integrity of the package.

Vent slits of the present technology can be formed in packages in any suitable manner. For example, vent slits can be installed by the film manufacturer or the food packer through the utilization of a razor blade wheel or razor blade puncture on a winding machine that slits the packages in a predetermined manner to form the vent slits.

In at least a second embodiment of a venting system of the present technology, a multilayer freezable, microwaveable package is provided that comprises a polyolefin film comprising a heat sealable layer, and an outer protective layer bonded to the polyolefin film; wherein the heat sealable layer of the polyolefin film is sealed to itself to form at least one seal; and wherein the at least one seal comprises at least one vent formed by at least one opening in the at least one seal of the package. In preferred embodiments, the package has at least one back seal, at least one first end seal, and at least one second end seal, and the at least one vent is formed by at least one opening in at least one of the seals of the package. In some embodiments where packages are exposed to high temperatures during microwave cooking, it has been observed that locating the at least one vent in the back seal of a package can result in seal failure, or film delamination at the vent location. Without being bound by any particular theory, it is believed that this is due to the build-up of heat and steam directly under the back seal when the bag is placed with the back seal facing up during microwave cooking. Accordingly, in particularly preferred embodiments, the at least one vent is formed by at least one opening in the at least one first end seal or the at least one second end seal of the package.

Vents of the present technology formed by openings in at least seal of a package can be any length from about 2 millimeters to about 20 millimeters, and are more preferably from about 5 millimeters to about 10 millimeters in length. For example, vents of the present technology formed by openings in at least seal of a package can be about 2.5 millimeters in length, about 3 millimeters in length, about 3.5 millimeters in length about 4 millimeters in length, about 5 millimeters in length, about 5.5 millimeters in length, about 7 millimeters in length, about 7.5 millimeters in length, about 9 millimeters in length, about 10 millimeters in length, about 12 millimeters in length, about 14 millimeters in length, about 15 millimeters in length, about 17 millimeters in length, about 18 millimeters in length, or about 19 millimeters in length.

Figure 3:
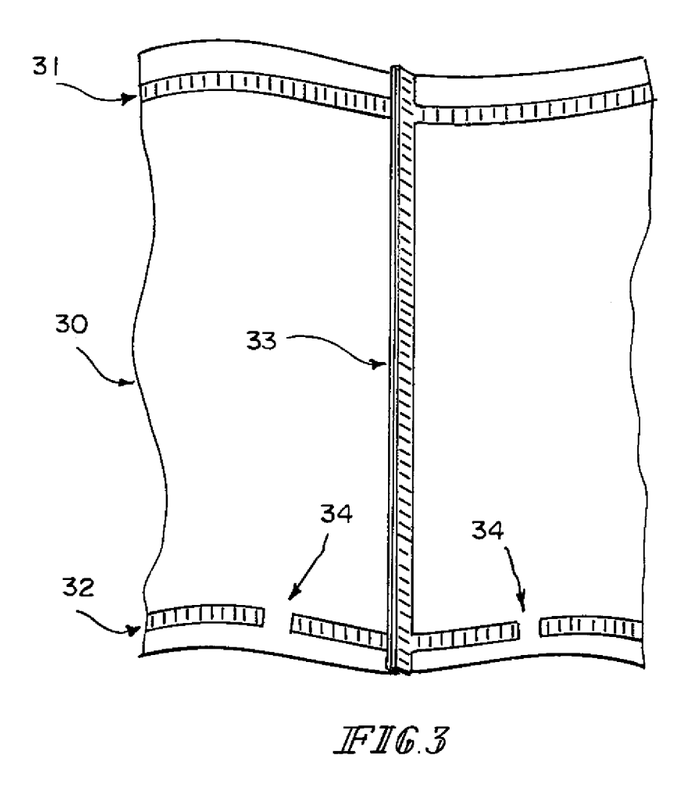
FIG. 3 illustrates one embodiment of a microwaveable pouch formed from a multilayer film of the present technology having two vent holes in the seal along one side of the pouch.

In particularly preferred embodiments of this type of venting system of the present technology, the package has at least two vents in at least one seal of the package. An example of such an embodiment is illustrated in FIG. 3. As shown in FIG. 3, a food package 30 is a pouch, or pillow-shaped package having a first end seal 31, a second end seal 32, and a back seal 33. The end seal 32 has two vents 34 formed by openings in the end seal 32. In the particular embodiment illustrated in FIG. 3, one vent 34 is formed by an opening in the end seal 32 on each side of the back seal 33. In an alternative embodiment, the two vents 34 could both be in the end seal 32 on one side of the back seal 33. In other embodiments, at least one vent can be formed by at least one opening in the first end seal 31 of a package and at least one additional vent can be formed by an opening in the second end seal 32 of the package. In some embodiments, packages of the present technology have 2, 3, 4, or greater than 4 vents formed by openings in at least one seal of the package.

Figure 4:
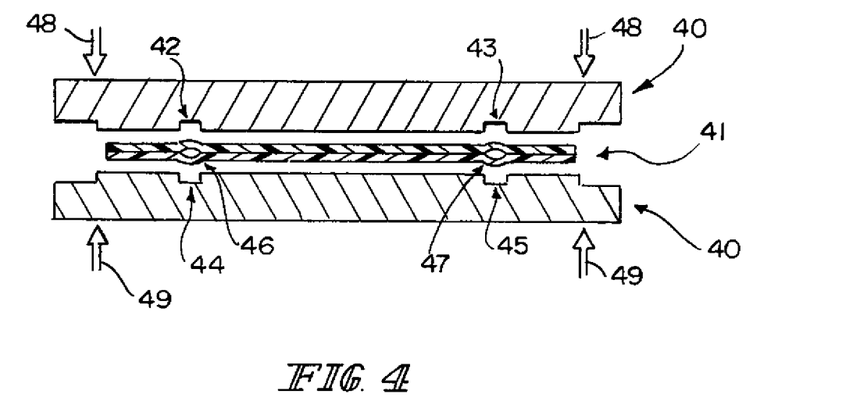
FIG. 4 illustrates one manner in which the vent holes in the seal of the pouch of FIG. 3 can be made.

Vents of the present technology formed in at least one seal of a package can be formed in any suitable manner. For example, one method suitable for use with the present technology is illustrated in FIG. 4, which shows corresponding pairs of notches in the heat sealing jaws 40 used to form the seal in film 41. As illustrated in FIG. 4, heat sealing jaws 40 press together in the directions shown by arrows 48 and 49 to form a heat seal in film 41. Corresponding notches 42 and 44 form an opening in the seal that forms vent 46. Similarly, corresponding notches 43 and 45 form an opening in the seal that forms vent 47.

In at least one further embodiment of a venting system of the present technology, a vent valve is provided in the package. In at least one such embodiment, a multilayer freezable, microwaveable package is provided that comprises a polyolefin film comprising a heat sealable layer, and an outer protective layer bonded to the polyolefin film; wherein the heat sealable layer of the polyolefin film is heat sealed to itself to form at least one seal; and wherein the package further comprises a vent valve. In preferred embodiments, the vent valve comprises a vent hole, a nonwoven patch, and a plastic patch.

Figure 5:
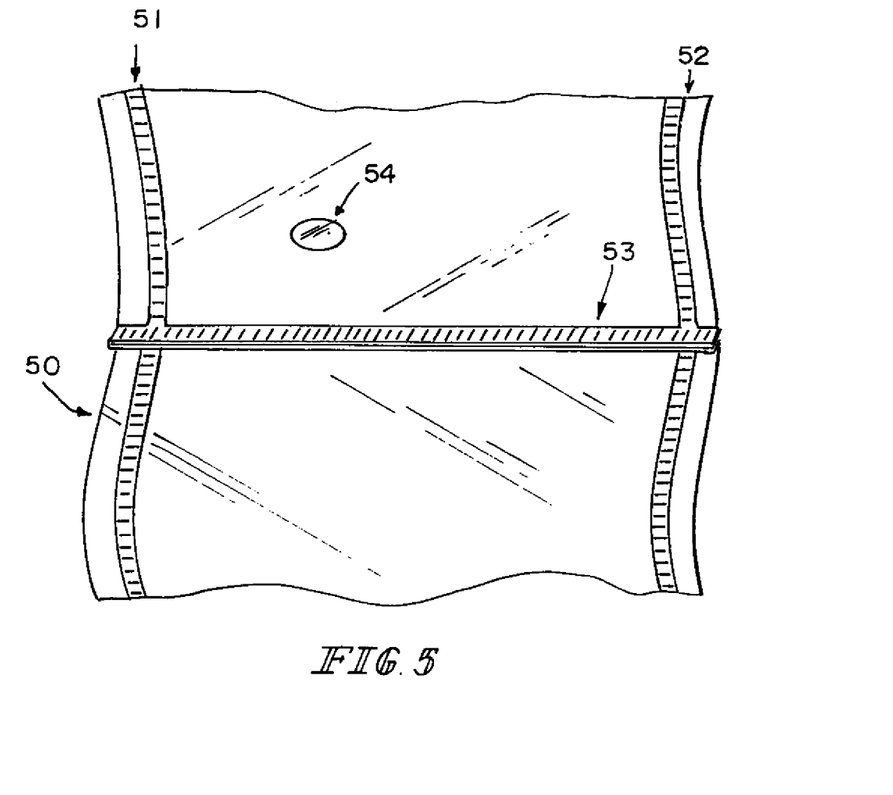
FIG. 5 illustrates one embodiment of a microwaveable pouch formed from a multilayer film of the present technology having one embodiment of a vent valve in the pouch.

FIG. 5 illustrates a pouch, or pillow-shaped package 50, having a first end seal 51, a second end seal 52, a back seal 53, and vent valve 54 on the back of the package. Valve 54 can be located anywhere on the back of the package 50, but is preferably at least about 1 centimeter or greater away from any seal of the package, particularly the back seal 53 of the package. For example, vent valve 54 can be about 1.25 centimeters (0.5 inches), about 1.5 centimeters, about 2 centimeters, about 2.5 centimeters (1 inch), about 3 centimeters, or farther away from the first end seal 51, the second end seal 52, or the back seal 53.

Figure 6:
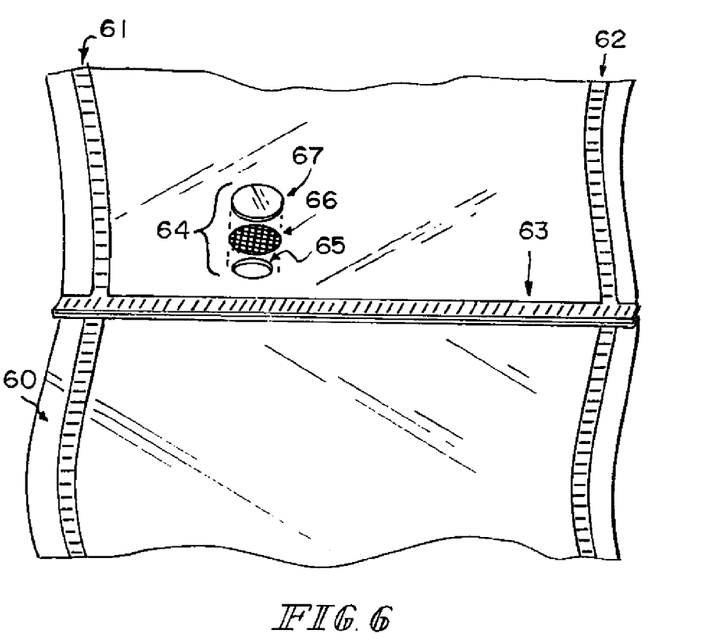
FIG. 6 illustrates one embodiment of a microwaveable pouch formed from a multilayer film of the present technology, with an exploded view of one embodiment of a vent valve in the pouch.

A package similar to the package in FIG. 5 is illustrated in FIG. 6, with an exploded view of the vent valve. FIG. 6 illustrates a pouch, or pillow-shaped package 60, having a first end seal 61, a second end seal 62, a back seal 63, and vent valve 64 on the back of the package. The vent valve 64 has a vent hole 65 in the package, a nonwoven patch 66 that covers vent hole 65, and a plastic patch 67 that covers the nonwoven patch 66. Such embodiments preferably provide a one-way vent valve suitable for packaging foods containing liquid, where steam and heat are permitted to vent out of a package during microwave cooking, but liquid does not leak from the package, and outside contaminants do not enter the package during storage or cooking.

Nonwoven materials suitable for use in nonwoven patches of the present technology include, for example, fibers of a polypropylene, a polyethylene, a polyethylene terephthalate polyester, a nylon, a paper, a blend thereof, or a mixture thereof. In one or more preferred embodiments, nonwoven patches of the present technology are breathable and also have a hydrohead property which provides a resistance to liquid penetration or leakage. Such patches provide the dual functions of preventing liquid from leaking out from the package, and releasing steam and heat to prevent the package from bursting during microwave cooking.

Plastic materials suitable for use in plastic patches of the present technology include, for example, polypropylenes, polyethylenes, polyethylene terephthalate polyesters, nylons, polystyrenes, polyvinyl chlorides, blends thereof, or mixtures thereof. The plastic patch preferably functions as a cover over the nonwoven patch to prevent air, other gases, or other undesirable contaminants from entering into the package.

Figure 7:
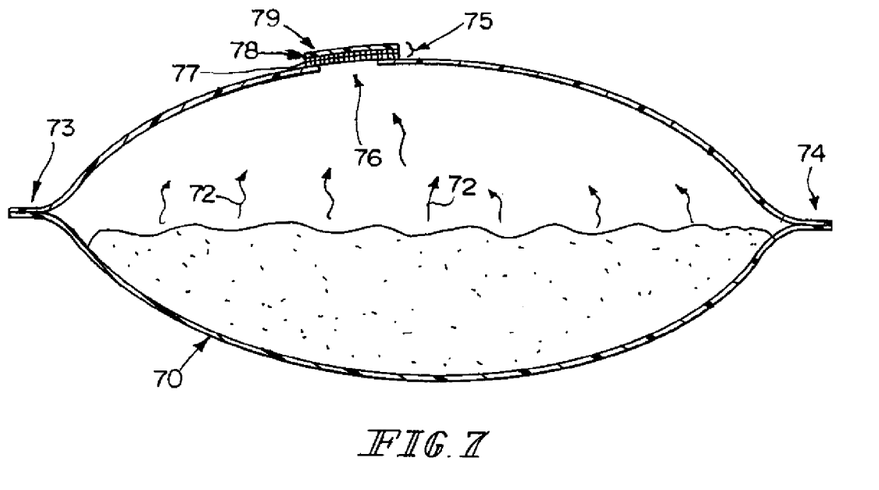
FIG. 7 illustrates one embodiment of a microwaveable pouch formed from a multilayer film of the present technology having one embodiment of a vent valve in the pouch.

FIG. 7 illustrates a side view of one embodiment of a package 70 having a vent valve 75 of the present technology for use during microwave cooking. As shown in FIG. 7, the package 70 has a first end seal 73 and a second end seal 74. The back seal of the package is not shown in this side view. The vent valve as shown has vent hole 76, nonwoven patch 77 covering vent hole 76, and plastic patch 79 covering nonwoven patch 77. During microwave cooking, food 71, contained within the package 70, heats up and generates steam 72. Steam 72 is vented through the vent hole 76 and the nonwoven patch 77, and is released via interface 78 between the nonwoven patch and the plastic patch.

Figure 8:
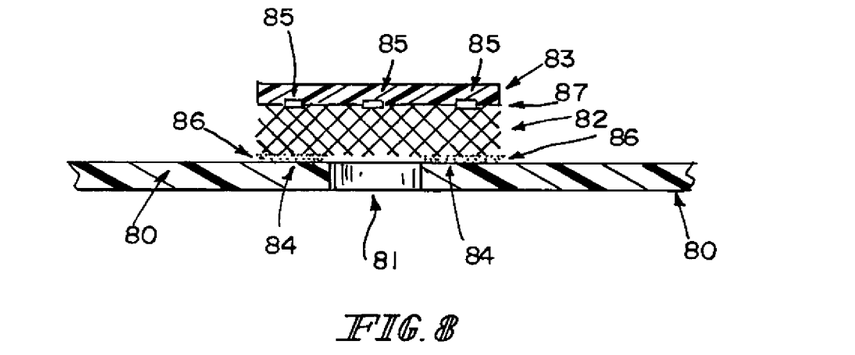
FIG. 8 illustrates a side view of one embodiment of a vent valve of the present technology.

In at least some preferred embodiments, the vent valve comprises a vent hole having an outer perimeter, the nonwoven patch covers the vent hole and is bonded to the package by a continuous bond around the outer perimeter of the vent hole, and the plastic patch is bonded to the nonwoven patch in at least two bonding locations. FIG. 8 shows a detail side view of one such embodiment. As shown in FIG. 8, film 80 has a vent hole 81 that has an outer perimeter 84. The nonwoven patch 82 covers the vent hole 81, and is bonded to the outer perimeter 84 of the vent hole 81 by a continuous bond 86. In preferred embodiments, the continuous bond 86 of the nonwoven patch 82 is a bond formed by heat sealing, adhesive bonding, or ultra-sonic welding. The plastic patch 83 is located over the nonwoven patch 82, and preferably completely covers the nonwoven patch 82. Further, the plastic patch is bonded to the nonwoven patch at bonding locations 85 along the interface 87 between the nonwoven patch and the plastic patch.

In the view shown in FIG. 8, three bonding locations 85 are shown between the plastic patch 83 and the nonwoven patch 82. In some embodiments, the plastic patch is bonded to the nonwoven patch at 2, 3, 4, 5, or greater than 5 bonding locations. The bonds between nonwoven patch 82 and plastic patch 83 can be formed by heat sealing, adhesive bonding, or ultra-sonic welding. In contrast to the bond between the nonwoven patch 82 and the outer perimeter 84 of the vent hole 81, the bond between nonwoven patch 82 and plastic patch 83 is not continuous along the interface 87. The partially unsealed interface that results provides open channels through which heat and steam vent during microwave cooking. Accordingly, it is preferred that the number and location of the bonds formed between the nonwoven patch and the plastic patch be sufficient to securely affix the plastic patch to the nonwoven patch, but also provide sufficient open channels for steam and heat to be released around the bonds during microwave cooking.

Figure 9:
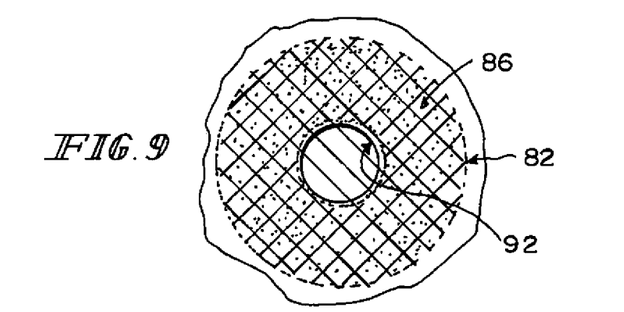
FIG. 9 illustrates one embodiment of a non-woven patch for use in a vent valve of the present technology.

FIG. 9 is a top view of one embodiment of a nonwoven patch 82 of the present technology, showing vent hole 92, and continuous bond 86 around the outer perimeter of vent hole 92.

Figure 10:
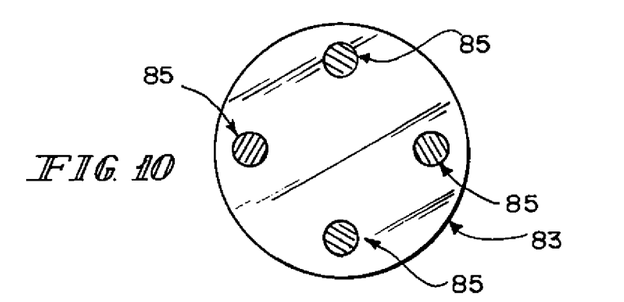
FIG. 10 illustrates one embodiment of a plastic film patch for use in a vent valve of the present technology.

FIG. 10 is a top view of one embodiment of a plastic patch 83 of the present technology, showing 4 bonding locations 85 at which the plastic patch is bonded to the nonwoven patch.

Although the vent valves and vent valve components illustrated in FIGS. 5-10 are circular, it should be understood that the shape can be varied. For example, the shape can be a triangle, a square, a rectangle, a trapezoid, a parallelogram, an octagon, or an n-gon wherein "n" is any suitable number of sides. Circular configurations, however, are preferred based upon the ease with which they can be manufactured. In embodiments where a vent hole is circular, the vent hole preferably has a diameter from about 2 millimeters to about 20 millimeters, such as, for example, about 3 millimeters, about 3.5 millimeters, about 4 millimeters, about 5 millimeters, about 6 millimeters, about 7 millimeters, about 7.5 millimeters, about 8 millimeters, about 10 millimeters, about 12 millimeters, about 15 millimeters, about 17 millimeters, or about 18 millimeters. In embodiments where the nonwoven patch is circular, the nonwoven patch has a diameter larger than the diameter of the vent hole, and preferably has a diameter from about 3 millimeters to about 50 millimeters, such as, for example, about 3 millimeters, about 3.5 millimeters, about 4 millimeters, about 5 millimeters, about 6 millimeters, about 7 millimeters, about 7.5 millimeters, about 8 millimeters, about 10 millimeters, about 12 millimeters, about 15 millimeters, about 17 millimeters, about 18 millimeters, about 20 millimeters, about 25 millimeters, about 30 millimeters, about 35 millimeters, about 40 millimeters, or about 45 millimeters. In embodiments where the plastic patch is circular, the plastic patch preferably has a diameter equal to the diameter of the nonwoven patch that is from about 3 millimeters to about 50 millimeters, such as, for example, about 3 millimeters, about 3.5 millimeters, about 4 millimeters, about 5 millimeters, about 6 millimeters, about 7 millimeters, about 7.5 millimeters, about 8 millimeters, about 10 millimeters, about 12 millimeters, about 15 millimeters, about 17 millimeters, about 18 millimeters, about 20 millimeters, about 25 millimeters, about 30 millimeters, about 35 millimeters, about 40 millimeters, or about 45 millimeters. In embodiments of vent valves used in 12 ounce packages of frozen vegetables, for example, it is preferred that the vent hole has a diameter from about 2 millimeters to about 8 millimeters, and that the nonwoven patch and the plastic patch each have a diameter from about 6 millimeters to about 12 millimeters.

Venting Systems of the present technology can be used with any film and any flexible packaging material suitable for use in microwave cooking of foods contained therein. In preferred embodiments, venting systems of the present technology are used in conjunction with freezable, microwavable films of the present technology. In some such embodiments, packages are provided comprising a freezable, microwavable film of the present technology and a venting system of the present technology that can withstand exposure to temperatures from about −20° C., or from about 0° C., to about 105° C., or more preferably to about 150° C.

The presently described technology is further illustrated by the following examples, which are not to be construed as limiting the invention or scope of the specific compositions described herein.

EXAMPLE 1

Freezable, Microwaveable Film and Package without Venting System

A microwaveable three-layer film was made using a conventional blown film coextrusion process. The structure of the three-layer film is given in Table 1 below.

TABLE 1

| Layer | Material of Layer (Weight % of Layer) | Resin Grade | Density | Melt Flow |
|---|---|---|---|---|
| Heat Seal | Copolymer polypropylene (30%) | Total ™ EOD02-15 | 0.895 g/cc | 12 g/10 min. (230° C.) |
|  | Copolymer polypropylene (70%) | Dow 6D20 | 0.9 g/cc | 1.9 g/10 min. (230° C.) |
| Core | Homopolymer polypropylene (100%) | Dow H110-02N | 0.9 g/cc | 2.0 g/10 min. (230° C.) |
| Outer Skin | Polyethylene (15%) | Voridian E6838-969F | 0.921 g/cc | 0.7 g/10 min. (190° C.) |
|  | LLDPE (85%) | Dow 2045 | 0.92 g/cc | 1.0 g/10 min. (190° C.) |

A polyester-polyurethane adhesive available from Sovereign Specialty Chemicals under the trade name Primabond® was applied to the outer skin layer to bond a PET film layer to the three-layer coextruded film described in Table 1. The PET film is available from Celplast Metallized Product Limited, Toronto, Ontario, Canada, under the trade name Cel-PET, and has a thickness of 0.48 mil. The resulting PET-laminated three-layer coextruded film was used to form a pillow-shaped freezable, microwaveable bag, such as illustrated in FIG. 2, to package 16 ounces mixed frozen vegetables. A heat-seal machine (from Sencorp Inc., Hyannis, Mass., model 12-12ASL/1) was used to seal the top, bottom, and back of the bag. The heat sealing temperature was set at 280° C. The pressure of the heat seal jaws was 60 psi. The dwell time was 1 second. Then, a sharp knife was used to pierce two 4-mm slits in the back of the bag to vent steam and prevent pressure build-up.

The freezable/microwaveable bag was placed in a freezer at a temperature of about −18° C. for about 24 hours. After about 24 hours, the bag was removed from the freezer and inspected. No fractures in the bag were detected.

The freezable/microwaveable bag was placed in a GE microwave oven (Model JE1235T001) at a cooking power of 1000 watts (W) and cooked for about 4 minutes. After being microwave cooked, the temperature measured in the food was about 95° C. to about 102° C. The bag did not melt or leak its contents, thus demonstrating excellent heat seal strength and excellent toughness and high temperature resistance of the film composition(s) of the presently described technology.

EXAMPLE 2

Comparative

Commercially available microwaveable bags were received as shipped. It was found that several bags in the shipment showed visible fractures, demonstrating an inability to withstand subzero temperatures and weak strength of the film. One of the bags was analyzed to determine its construction. The bag had a thickness of 3 mils.

The analysis showed that the bag was a three-layer laminated bag having the structure shown in Table 2.

TABLE 2

| Layer Material | Layer % |
|---|---|
| PET | 23 |
| Adhesive + ink | 3 |
| Polypropylene homopolymer + TiO2 | 74 |

A bag having this laminated three-layer PET/adhesive/PP homopolymer structure was placed in the same GE microwave at the same cooking power of 1000 watts as the Example 1 bag and was cooked for about 4 minutes. The microwaved bag exhibited seal failure, demonstrating poor heat seal strength and poor seal quality when exposed to microwave temperatures. In contrast, the Example 1 bag, made in accordance with the present technology, demonstrated both excellent low temperature resistance and excellent heat seal strength and toughness at microwave temperatures, making the bag suitable for microwaveable frozen food packaging as described herein.

EXAMPLE 3

Freezable, Microwaveable Film

A freezable microwavable film of the present technology was made using a conventional blown film coextrusion process. The structure of the film is given in Table 3.

TABLE 3

| Layer | Material of Layer (Weight % of Layer) | Resin Grade | Density | Melt Flow |
|---|---|---|---|---|
| Heat seal | Copolymer polypropylene 30% | Total ™ EOD02-15 | 0.895 g/cc | 12 g/10 min. (230° C.) |
| | Copolymer polypropylene 70% | Dow 6D20 | 0.9 g/cc | 1.9 g/10 min. (230° C.) |
| Core | Homopolymer polypropylene 100% | Dow H110-02N | 0.9 g/cc | 2.0 g/10 min. (230° C.) |
| Outer Skin | Copolymer polypropylene 30% | Total ™ EOD02-15 | 0.895 g/cc | 12 g/10 min. (230° C.) |
| | Copolymer polypropylene 70% | Dow 6D20 | 0.9 g/cc | 1.9 g/10 min. (230° C.) |

A polyurethane adhesive, such as, for example, a polyester-polyurethane adhesive available from Rohm and Hass Company under the trade name Mor-Free® Solventless Laminating Adhesive, or from Liofol Company, Cary, N.C., under the trade name Tycel® adhesive, can preferably be applied to the outer skin layer to bond a PET film layer to the three-layer coextruded film. The PET film is available from Kolon Industries, Inc., Korea, under the trade name Astroll® Polyester Film, and has a thickness of 0.48 mil or from Pilcher Hamilton Corporation, Willowbrook, Ill., under the trade name PHanex® CT polyester film, and has a thickness 0.48 mil.

EXAMPLE 4

Comparative Performance Evaluation of Packages with Steam Vent System

Freezable, microwavable packages of the present technology were evaluated in comparison to conventional microwave coking of frozen vegetables.

The freezable microwaveable film described in Example 3 was used to make pillow-shaped packages for testing. Some of the packages were designated as Type A packages, and were made with two vent slits in the back of the package. Each vent slit was about 7 millimeters in length. Some of the packages were designated as Type B packages, and were made with two vents formed by openings in one end seal of the package.

All of the test packages made from the film of Example 3 were approximately the same size and were manufactured on the same Hayssen vertical form-fill-seal machine. The package size was about 6.25 inches wide by about 9 inches long. Frozen vegetables were purchased from a local grocery store. Each test package was filled with about 12 ounces of frozen vegetables, and was then heat sealed. All of the test packages were then stored in a freezer at about −18° C. (0° F.) overnight prior to testing. Ten packages of each type were subsequently tested as described below, five containing frozen mixed vegetables, and five containing frozen broccoli.

Each of the test packages was removed from the freezer, weighed, and placed in a microwave oven with a rotating table. Each test package underwent 5 minutes of cook time at approximately 1200 W of power. Temperature and pressure measurements for each package were recorded before, during, and after the cook cycle. After each package was removed from the microwave oven, each package was weighed, and the temperature of the food was measured at several locations to estimate the uniformity of the food temperature.

Nine comparative packages of a commercially available freezable, microwavable package were also tested in the same manner described above for the test packages in this Example, four were filled with about 12 ounces of mixed frozen vegetables and five were filled with about 12 ounces of frozen broccoli.

A conventional microwave cooking method was also tested using ten commercially purchased packages of frozen mixed vegetables. Each package was opened and the frozen mixed vegetables were placed on a microwave-safe dish and then covered by a Reynolds® plastic wrap. Each dish was weighed, cooked in a microwave oven with rotating table at approximately 1200 W of power for 5 minutes, and then allowed to stand in the microwave oven for about 1 minute of equilibration time prior to being removed from the microwave. After each dish was removed from the microwave oven, each dish was weighed, and the temperature of the food was measured at several locations to estimate the uniformity of the food temperature.

Table 4 below summarizes the microwave cooking data with respect to frozen mixed vegetables, providing the mean peak temperature and pressure during cooking Table 5 below summarizes the microwave cooking data with respect to frozen broccoli, providing the mean peak temperature and pressure during cooking. The standard deviation (STD) for the temperature and pressure measurements is also provided for each of Tables 4 and 5.

TABLE 4

| Package Type | Peak Temperature (° C.) | Temp STD | Peak Pressure (psi) | Pressure STD |
|---|---|---|---|---|
| A (Vent Slits) | 101.5 | 1.0 | 1.15 | 0.31 |
| B (Vent Holes) | 101.0 | 0.61 | 0.82 | 0.38 |
| Comparative | 100.7 | 0.75 | 0.69 | 0.40 |
| Conventional | 87.0 | 6.0 | Ambient | — |

TABLE 5

| Package Type | Peak Temperature (° C.) | Temp STD | Peak Pressure (psi) | Pressure STD |
|---|---|---|---|---|
| A (Vent Slits) | 100.7 | 1.1 | 0.94 | 0.33 |
| B (Vent Holes) | 100.5 | 0.76 | 0.82 | 0.39 |
| Comparative | 99.8 | 1.5 | 0.80 | 0.22 |

The mean peak temperature and pressure for the packages tested, including Types A and B as well as the comparative, were higher than the mean peak temperature and pressure for the conventional microwave cooking method. Further, the standard deviations in the temperatures for the tested packages were less than that of the conventional microwave cooking method. Additionally, the mean peak temperatures and pressures for the Type A and B packages were slightly higher than those of the comparative packages. The packages of Type A and Type B all vented during the microwave cooking process. One of the test packages exhibited delamination at one end seal, however, no packages burst or melted at any location.

Table 6 below summarizes the microwave cooking data with respect to frozen mixed vegetables, and provides the moisture loss during testing, determined by the percent change in weight as measured prior to cooking and after cooking, and the mean temperature of the vegetables as measured after cooking. The standard deviations for each mean are also provided. Table 7 below summarizes the microwave cooking data with respect to frozen broccoli, and provides the moisture loss during testing and the mean temperature of the vegetables as measured after cooking. The standard deviations for each mean are also provided.

TABLE 6

| Package Type | Moisture Loss (%) | Loss STD | Mean Food Temp (° C.) | Temp STD |
|---|---|---|---|---|
| A (Vent Slits) | 4.7 | 0.94 | 82.8 | 1.2 |
| B (Vent Holes) | 4.8 | 1.6 | 82.5 | 2.1 |
| Comparative | 3.6 | 0.57 | 81.1 | 1.9 |
| Conventional | 13.3 | 7 | 73.9 | 8.7 |

TABLE 7

| Package Type | Moisture Loss (%) | Loss STD | Mean Food Temp (° C.) | Temp STD |
|---|---|---|---|---|
| A (Vent Slits) | 3.7 | 1.0 | 77.7 | 1.3 |
| B (Vent Holes) | 3.4 | 1.0 | 77.5 | 2.2 |
| Comparative | 3.3 | 1.6 | 77.6 | 2.2 |

The Type A and B packages had slightly more moisture loss and a slightly higher mean food temperature than the comparative packages with respect to mixed vegetables, and were even closer to the comparative results with respect to the broccoli. The Type A and B packages had significantly less moisture loss, higher food temperature, and less temperature variation in the food than the conventionally cooked vegetables.

The invention has now been described in such full, clear, concise and exact terms as to enable any person skilled in the art to which it pertains, to practice the same. It is to be understood that the foregoing describes preferred embodiments and examples of the invention and that modifications may be made therein without departing from the spirit or scope of the invention as set forth in the claims.

What is claimed is:

1. A multilayer freezable, microwaveable package comprising:
(a) a polyolefin film comprising an inner heat sealable layer, at least one core layer adjacent to the heat sealable layer, and an outer skin layer adjacent to the at least one core layer opposite the heat sealable layer,
wherein the heat sealable layer comprises at least one polypropylene/alpha-olefin copolymer having a melt flow rate of about 0.5 g/10 min to about 45 g/10 min at about 230° C.;
wherein the at least one core layer comprises a polymeric material having a melting point of at least 71° C.; and
wherein the outer skin layer comprises at least one polyethylene resin having a melt flow index of about 0.50 g/10 min to about 20 g/10 min at about 190° C.;
and
(b) an outer protective layer bonded to the outer skin layer of the polyolefin film, the outer protective layer being formed from a heat resistant polymeric material;
wherein the polyolefin film bonded to the outer protective layer forms a multilayer freezable, microwaveable film that can be exposed to a temperature of from about 0° C. to about −20° C. without fracturing and is temperature resistant at about 150° C.;
wherein the heat sealable layer of the polyolefin film is sealed to itself to form the package;
wherein the package further comprises at least one vent slit through the package, the at least one vent slit having a length from about 2 millimeters to about 12 millimeters; and
wherein the package has a peak internal pressure of at least about 0.3 psi during microwave cooking when the internal temperature is at least about 71° C.

2. The multilayer freezable, microwaveable package of claim 1, wherein the at least one vent slit is from about 5 millimeters to about 10 millimeters in length.

3. The multilayer freezable, microwaveable package of claim 1, further comprising at least one back seal, at least one first end seal, and at least one second end seal;
wherein the at least one vent slit is a distance of at least about 1 centimeter from the at least one back seal, the at least one first end seal, or the at least one second end seal.

4. The multilayer freezable, microwaveable package of claim 1, wherein the heat sealable layer comprises a blend of polypropylene/alpha-olefin copolymers.

5. The multilayer freezable, microwaveable package of claim 1, wherein the outer protective layer is a polyethylene terephthalate film, a nylon film, a biaxially oriented polypropylene film, or a biaxially oriented propylene/ethylene copolymer film.

6. A multilayer freezable, microwaveable package comprising:
(a) a polyolefin film comprising an inner heat sealable layer, at least one core layer adjacent to the heat sealable layer, and an outer skin layer adjacent to the at least one core layer opposite the heat sealable layer,
wherein the heat sealable layer comprises at least one polypropylene/alpha-olefin copolymer having a melt flow rate of about 0.5 g/10 min to about 45 g/10 min at about 230° C.;
wherein the at least one core layer comprises a polymeric material having a melting point of at least 71° C.; and
wherein the outer skin layer comprises at least one polyethylene resin having a melt flow index of about 0.50 g/10 min to about 20 g/10 min at about 190° C.;
and
(b) an outer protective layer bonded to the outer skin layer of the polyolefin film, the outer protective layer being formed from a heat resistant polymeric material;
wherein the polyolefin film bonded to the outer protective layer forms a multilayer freezable, microwaveable film that can be exposed to a temperature of from about 0° C. to about −20° C. without fracturing and is temperature resistant at about 150° C.;
wherein the heat sealable layer of the polyolefin film is sealed to itself to form at least one seal; and
wherein the at least one seal comprises at least one vent formed by at least one opening in the at least one seal of the package.

7. The multilayer freezable, microwaveable package of claim 6, wherein the heat sealable layer of the polyolefin film is sealed to itself to form at least one back seal, at least one first end seal, and at least one second end seal; and
wherein the at least one vent is formed by at least one opening in the at least one first end seal or the at least one second end seal.

8. The multilayer freezable, microwaveable package of claim 6, wherein the at last one vent is from about 2 millimeters to about 20 millimeters in length.

9. The multilayer freezable, microwaveable package of claim 6, wherein the at last one vent is from about 5 millimeters to about 10 millimeters in length.

10. The multilayer freezable, microwaveable package of claim 6, wherein the heat sealable layer comprises a blend of polypropylene/alpha-olefin copolymers.

11. The multilayer freezable, microwaveable package of claim 6, wherein the outer protective layer is a polyethylene terephthalate film, a nylon film, a biaxially oriented polypropylene film, or a biaxially oriented propylene/ethylene copolymer film.

12. A multilayer freezable, microwaveable package comprising:
   (a) a polyolefin film comprising an inner heat sealable layer, at least one core layer adjacent to the heat sealable layer, and an outer skin layer adjacent to the core layer opposite the heat sealable layer,
   wherein the heat sealable layer comprises at least one polypropylene/alpha-olefin copolymer having a melt flow rate of about 0.5 g/10 min to about 45 g/10 min at about 230° C.;
   wherein the at least one core layer comprises a polymeric material having a melting point of at least 71° C.; and
   wherein the outer skin layer comprises at least one polyethylene resin having a melt flow index of about 0.50 g/10 min to about 20 g/10 min. at about 190° C.; and
   (b) an outer protective layer bonded to the outer skin layer of the polyolefin film, the outer protective layer being formed from a heat resistant polymeric material;
   wherein the polyolefin film bonded to the outer protective layer forms a multilayer freezable, microwaveable film that can be exposed to a temperature of from about 0° C. to about −20° C. without fracturing and is temperature resistant at about 150° C.;
   wherein the heat sealable layer of the polyolefin film is heat sealed to itself to form at least one seal; and
   wherein the package further comprises a vent valve comprising a vent hole, a nonwoven patch, and a plastic patch.

13. The multilayer freezable, microwaveable package of claim 12, wherein the vent hole is circular and has a diameter from about 2 millimeters to about 20 millimeters.

14. The multilayer freezable, microwaveable package of claim 12, wherein the nonwoven patch is circular and has a diameter from about 3 millimeters to about 50 millimeters.

15. The multilayer freezable, microwaveable package of claim 12, wherein the plastic patch is circular and has a diameter from about 3 millimeters to about 50 millimeters.

16. The multilayer freezable, microwaveable package of claim 12, wherein the nonwoven patch covers the vent hole and is bonded to the package by a continuous bond; and wherein the plastic patch is bonded to the nonwoven patch in at least two bonding locations.

17. The multilayer freezable, microwaveable package of claim 12, wherein the nonwoven patch comprises fibers of a polypropylene, a polyethylene, a polyethylene terephthalate polyester, a nylon, a paper, a blend thereof, or a mixture thereof.

18. The multilayer freezable, microwaveable package of claim 12, wherein the plastic patch comprises a polypropylene, a polyethylene, a polyethylene terephthalate polyester, a nylon, a polystyrene, a polyvinyl chloride, a blend thereof, or a mixture thereof.

19. The multilayer freezable, microwaveable package of claim 12, wherein the heat sealable layer comprises a blend of polypropylene/alpha-olefin copolymers.

20. The multilayer freezable, microwaveable package of claim 12, wherein the outer protective layer is a polyethylene terephthalate film, a nylon film, a biaxially oriented polypropylene film, or a biaxially oriented propylene/ethylene copolymer film.

* * * * *